United States Patent [19]

Daldrup et al.

[11] 4,266,968

[45] May 12, 1981

[54] PROCESS FOR INJECTING BROWN COAL INTO A BLAST FURNACE

[75] Inventors: Heinz G. Daldrup, Kerpen-Sindorf; Günther Nothhelfer, Frechen; Friedrich H. Franke, Cologne, all of Fed. Rep. of Germany; Raymond Limpach, Huncherange, Luxembourg

[73] Assignees: Rheinische Braunkohlenwerke A.G., Stüttgenweg, Fed. Rep. of Germany; Arbed S.A., Luxembourg

[21] Appl. No.: 133,555

[22] Filed: Mar. 25, 1980

[30] Foreign Application Priority Data

Mar. 29, 1979 [DE] Fed. Rep. of Germany ....... 2912441

[51] Int. Cl.³ .............................................. C21B 5/00
[52] U.S. Cl. ...................................................... 75/42
[58] Field of Search ...................... 75/41, 42; 266/267, 266/270

[56] References Cited

U.S. PATENT DOCUMENTS

| 3,558,119 | 1/1971 | Demalander | 75/42 |
| 3,971,654 | 7/1976 | Mancke | 75/42 |

*Primary Examiner*—M. J. Andrews
*Attorney, Agent, or Firm*—Parmelee, Miller, Welsh & Kratz

[57] ABSTRACT

In a process for injecting fine-grain brown coal or lignite into a blast furnace through tuyere arches thereof, the initial speed at which coal dust, after leaving the supply conduit, moves towards the center of the blast furnace hearth is substantially lower than the speed at which the hot blast is blown into the furnace.

26 Claims, No Drawings

PROCESS FOR INJECTING BROWN COAL INTO A BLAST FURNACE

BACKGROUND OF THE INVENTION

This invention is concerned with a process for injecting brown coal or lignite into a blast furnace through the tuyere arches or notches. In this specification, the terms brown coal and lignite may be used interchangeably, in other words, a reference to brown coal is intended to include lignite and a reference to lignite is intended to include brown coal; in this connection it may be noted that, although brown coal and lignite are generally considered as the same material, there may possibly on recent knowledge be a difference betweeen the two types of material, both of which are therefore encompassed by the present invention. For convenience and brevity, the term brown coal is generally used in this specification to denote both forms of material.

Many efforts have been made, over a substantial period of time, to reduce the consumption of coke in a blast furnace by using a low-cost fuel and/or by directly introducing reduction agents into the blast furnace. Thus, the introduction of heavy oil has been proposed in this respect. It is also known for reduction gas mixtures which predominantly comprise $H_2$ and $CO$ and which are possibly produced by regeneration of waste outlet gas to be blown into the blast furnace, either into the hearth thereof or into the lower region of the actual blast furnace stack.

The injection of fine-grain coal, including brown coal or lignite, into the blast furnace, has long been the subject of tests and endeavours in this respect. Although the marked increase in recent years in the price of fuel oil has inevitably encouraged the use of coal wherever coal is available more cheaply than oil, the injection of coal into the blast furnace under practical operating conditions has hitherto been used only to a very limited extent. This is due on the one hand to the fact that the transportation and distribution of fine-grain coal from a supply container into the injection blowing opening of the blast furnace involve greater difficulties than when using a fluid agent, for example oil or gas. Added to this is the fact that normally the necessary conditions for a rapid and therefore complete conversion reaction within the blast furnace are much more favourable when using oil and gas than when using a solid fuel. In this respect, account should be taken of the fact that reaction of the fuel introduced must be as complete as possible, if only for reasons of cost. In addition, incomplete reaction, particularly in the case of solid fuel, would generally result in serious disturbances and even breakdowns in operation of the blast furnace, for example due to the production of soot or black which would reduce the permeability of the blast-furnace burden in regard to the flow of reduction gas and which would possibly also be present in the outlet gas. The latter can result in operational problems in the pieces of equipment through which the outlet gas flows. Although the use of brown coal dust or lignite dust as an additive fuel has already been under discussion for more than ten years, see for example Neue Hütte, 10th edition, issue 12, pages 708 to 710, use thereof in practice has been limited just to test operations. This is evidently because no one has hitherto succeeded in completely and satisfactorily solving the questions and problems concerned with the complete reaction of the brown coal in the hearth of the blast furnace. Thus, in a discussion paper by J Mangelsdorf in 'Le coke en sidérurgie', in connection with the Charleroi International Congress, 1966, page 535, it is pointed out that, with the increasing addition of brown coal dust or lignite dust to for example 150 to 160 kg/tonne of crude iron, the exchange relationship of a kilogram of coke per kilogram of brown coal or lignite dust is considerably reduced.

In Erdöl, Kohl, Erdgas, Petrochemie, 18, 1965, pages 112 to 118, there is a report about research into and testing of combustion or gasification performances of particular auxiliary fuels in the tuyere arches or notches. The view expressed is that the combustion and gasification of fine coal is more complicated and slower in comparison with natural gas and heating or fuel oil, as a number of steps are involved, some of which are carried out in succession while others are performed in parallel. In this respect it is stated that only grains with a diameter of more than 1 mm are completely degassed in the heating region, whereas smaller grains are first discharged with the flow of gas from the heating region as a result of their lower speed of downward movement.

SUMMARY OF THE INVENTION

An object of the present invention is to provide a process for injecting fine-grain brown coal or lignite into a blast furnace, wherein the difficulties and imperfections which have occurred hitherto are eliminated or at least substantially reduced.

A further object of the invention is to perform such a process in such a way that operation of the blast furnace does not suffer from significant influences nor has to be adapted to altered conditions by virtue of using fine-grain brown coal or lignite instead of oil or gas.

A further object is to provide such a process wherein the conversion reaction upstream of and within the blast furnace takes place in as complete a fashion as possible and in a short period of time.

A still further object of the invention is for preliminary treatment of the coal before being used in the furnace to be simple and to incur little cost.

Another object of the invention is to make it possible to use an uncomplicated apparatus for introducing brown coal or lignite into a blast furnace.

These and other objects are achieved by a process for injecting fine-grain brown coal into a blast furnace through the tuyere arches or notches, wherein the initial speed at which the particles of coal dust move, after leaving the feed conduit, towards the middle region of the hearth, is substantially lower than the speed at which the hot blast passes into the tuyere notch or arch, or into the hearth.

EMBODIMENTS OF THE INVENTION

The process preferably provides for continuous injection of the brown coal, under pressure. The speed of the hot blast should preferably be at least twice the initial speed of the coal dust particles. It has been found particularly desirable for the speed thereof to be greater than the speed at which the brown coal dust burns back, but less than 50 meters/second, and preferably less than 25 meters/second. It is optionally also possible for the injection speed to be as low as the speed of burning back, being generally of the order of 13 meters/second. A low initial speed of this kind, which is substantially lower than the speed of about 120 to 250 meters/second at which the hot blast, normally at a temperature of from about 1000° to 1200° C., is blown into the furnace through the tuyere arches or notches, increases the residence time of the particles of dust in the region which is before each tuyere notch and which is more or less free of solid constituents. In practical operation, it will be found that reaction of the individual particles of brown coal, which are moved by the hot blast from the tuyere or the periphery of the hearth towards the middle thereof, is virtually complete upon the particles reaching the boundary limit of the above-mentioned empty region.

Normally, the brown coal dust is introduced through a lance inserted into the tuyere arch or notch or blast tuyere which is provided in any case, that is to say, independently of the hot blast which accelerates the individual dust particles as soon as they have issued from the lance into the region of the tuyere, whereby the dust particles are moved towards the inner boundary of the above-mentioned empty region, that is to say, substantially towards the middle of the hearth. In this respect, it is not absolutely necessary for the dust particles to issue from the lance at the above-indicated speed. This will be necessary only when the lance or the discharge opening thereof extends precisely axially with respect to the tuyere notch or the direction of flow of the hot blast. If this condition is not satisfied, the discharge speed and thus possibly also the conveying speed within the supply conduit can be greater, as the important factor is not the speed of discharge at the lance but the initial speed at which the paticle of brown coal is moved towards the centre of the hearth.

It may be desirable for the brown coal, after leaving the lance which constitutes the supply conduit into the tuyere, to be caused to cover such a distance in the tuyere or tuyere notch that, upon entering the hearth, it is completely or substantially degassed and has reacted with the oxygen of the hot blast so that essentially gaseous degasification and reaction products from the brown coal, apart from the solid ash residues, pass into the hearth. One way of achieving this is for the supply conduit or lance to open into the tuyere or notch at a suitable distance from the mouth of the opening at which the tuyere notch opens into the hearth.

In any event, the high relative speed as between a brown coal or lignite particle and the hot blast has the result that the degasification and gasification products of the particles are immediately carried away therefrom so that, as long as there is a relative speed therebetween, fresh hot blast will always be brought into contact with the particle. In practice, it has been found that, when the above-mentioned conditions are observed, that is to say, when there is a large difference in speed between the hot blast on the one hand and the particles of brown coal on the other hand, optimum results can be achieved. This is shown for example by the fact that the exchange relationship as between a kilogram of dry coke per kilogram of brown coal dust remains virtually constant irrespective of the amount of brown coal dust in kg/t. crude iron. The brown coal is completely reacted in this respect. The mode of operating the blast furnace is unchanged in comparison with operation involving the introduction of heavy oil. This makes it possible for the blast furnace to be switched over from brown coal (or lignite) to heavy oil and vice-versa, if required, within a very short period of time, for example in the event of trouble, without this having any effect on the operating conditions of the blast furnace. There is only the composition of the waste or outlet gas which undergoes a slight change, in the direction of an increase in the $H_2$ content, when using brown coal dust. However, this increase in the $H_2$ content tends to have an advantageous influence on the reduction operation in the shaft of the blast furnace so that this change is in no way disadvantageous.

In accordance with the further proposal of the invention, the carrier gas for the brown coal should advantageously constitute less than 4% and preferably about 3–1% of the total hot blast which is blown in through the tuyere notches. Even if the carrier gas used is cold compressed air, as is readily possible, the resulting amount is too slight for it to be able to have any marked influence on the heat balance sheet of the blast furnace.

It is also possible for the carrier gas used to be a gas or gas mixture which contains one or more reduction agents and/or is reacted in the blast furnace to form at least one reduction agent. This may be for example a recycled and cleaned waste or outlet gas which can possibly also be regenerated. In this case also, the amount of carrier gas is too slight for it to be able to have any marked influence on the heat balance sheet of the blast furnace.

Thus, there are scarcely any restrictions to be observed with regard to the carrier gas selected. It is also possible to use $CH_4$ or another gas or gas mixture. Thus it would be possible for example for the carrier gas to be taken from a gasification reactor which is disposed upstream of the blast furnace, for production of auxiliary reduction gas, in which case the gas mixture will substantially comprise CO and $H_2$.

The brown coal dust may have a water content of up to 15%, preferably up to 10%, although even lower values, for example 5%, are quite possible. It has been found however that a brown coal dust with a water content of about 10% is in the nature of an optimum value, as the expenses incurred by the drying operation are not so high and on the other hand, such a water content does not cause any difficulties in the blast furnace. In particular the additional amount of heat required is low, especially as it can be compensated by an additional amount of brown coal dust or lignite dust or by higher temperatures in respect of the blast blown into the blast furnace. Moreover, in particular by virtue of the colloidal bonding action thereof, the water content in the brown coal may have the result that, upon entering the blast furnace, the high temperature of for example 1000° to 1200° C. which suddenly acts on the introduced matter at that point causes the water to evaporate in an explosive manner and the coal grain, which is already small in any case, bursts, together with the other volatile constituents which are also driven out by the explosive effect, so that the specific surface area of the coal is increased, with the result of an acceleration in the conversion reaction.

A further advantage is that in any event, with a water content of 10% and a hot blast temperature of the order of magnitude of 1100° C., it is possible for quite considerable amounts of brown coal dust, which at least correspond to the amounts of heavy oil which are normally injected, to be blown into the furnace, without any substantial oxygen enrichment of the hot blast being required in order to achieve satisfactory reaction. Depending on the mode of operation of the blast furnace, up to 1500 kg of brown coal dust of the above-described character can be blown into the hearth per hour and per tuyere arch or notch. Depending on the particular conditions prevailing, it is possible for 350 kg of brown coal dust (with a moisture content of 10%) per tonne of coke to be blown into the hearth of the blast furnace.

It is optionally possible for the mixture of carrier gas and brown coal dust to have a swirl effect imparted thereto directly before the mixture issues into the tuyere notch or arch or into the blast furnace hearth, thereby to produce even more intimate mixing thereof with the hot blast and an even greater relative speed as between the hot blast and the individual particles of coal dust. However this will not be necessary under normal circumstances.

The grain size of the brown coal dust should predominantly be below 1 mm. It is particularly advantageous for at least 50% and preferably 65% of the brown coal dust to be of less than 0.1 mm in grain size, and for possibly less than 5% to be more than 0.5 mm in grain size. In any event, uniformity or regularity in respect of the grain size of the brown coal or lignite dust will have an advantageous effect, both in regard to transportation and also in regard to the conversion reaction in the hearth.

Various modifications may be made in the above-described invention without thereby departing from the spirit and scope thereof.

What is claimed is:

1. In a process for injecting fine-grain brown coal into a blast furnace through tuyere notches thereof, the improvement which provides that the initial speed at which the brown coal particles move after leaving a feed conduit therefor towards the center region of the hearth is substantially lower than the speed at which the hot blast passes into the tuyere notch.

2. A process as set forth in claim 1 wherein injection of the brown coal is continuous.

3. A process as set forth in claim 1 wherein the speed of the coal dust particles is greater than the burn-back speed but not more than 50 meters/second.

4. A process as set forth in claim 3 wherein said speed is not more than 25 meters/second.

5. A process as set forth in claim 1 wherein the brown coal is at least substantially degassed and reacted in the tuyere notch.

6. A process as set forth in claim 1 wherein the brown coal carrier gas constitutes less than 4 percent of the total hot blast blown through the tuyere notch.

7. A process as set forth in claim 6 wherein the brown coal carrier gas constitutes about 3–1 percent of said total hot blast.

8. A process as set forth in claim 6 wherein said carrier gas used is compressed air.

9. A process as set forth in claim 8 wherein said compressed air is cold air.

10. A process as set forth in claim 6 wherein said carrier gas is a gas mixture.

11. A process as set forth in claim 1 wherein the brown coal carrier gas contains a reduction agent.

12. A process as set forth in claim 1 wherein the brown coal carrier gas is a gas capable of reaction in the blast furnace to form a reduction agent.

13. A process as set forth in claim 1 wherein the brown coal carrier gas used is recycled cleaned outlet gas.

14. A process as set forth in claim 13 wherein said outlet gas has been regenerated.

15. A process as set forth in claim 1 wherein the brown coal dust has a water content of up to 15%.

16. A process as set forth in claim 15 wherein the brown coal dust has a water content of up to 10%.

17. A process as set forth in claim 15 wherein said water content produces an aditional heat requirement which is compensated by a corresponding additional amount of brown coal.

18. A process as set forth in claim 15 wherein said water content produces an additional heat requirement which is compensated by an increase in the blast air temperature.

19. A process as set forth in claim 1 wherein the mixture of carrier gas and brown coal is sujected to a swirl action directly before it issues into the tuyere notch.

20. A process as set forth in claim 1 wherein the brown coal used has a grain size which is predominantly below 1 mm.

21. A process as set forth in claim 20 wherein at least 50% of the brown coal has a grain size of below 0.1 mm.

22. A process as set forth in claim 21 wherein about 65% of the brown coal has a grain size of below 0.1 mm.

23. A process as set forth in claim 20 wherein less than 5% of the brown coal has a grain size of over 0.5 mm.

24. A process for continuously injecting finely grained brown coal into the hearth of a blast furnace wherein the brown coal is blown under pressure into the hearth through tuyere notches, the initial speed of the brown coal after leaving a feed duct thereof towards the center of the hearth is lower than the flow speed of the hot blast into the hearth, the gas carrying the brown coal is less than 4% of the total of the hot blast, and the brown coal has a water content of not more than 15%.

25. A process for continuously injecting finely grained brown coal into the hearth of a blast furnace wherein the brown coal is blown under pressure into the hearth through tuyere notches, the initial speed of the brown coal after leaving a feed duct thereof towards the center of the hearth is lower than the flow speed of the hot blast into the hearth, and the grain size of the brown coal is predominantly below 1 mm.

26. A method of operating a blast furnace, including the injection of fine-grain brown coal into the furnace hearth through tuyere notches, the initial speed of the brown coal after leaving the feed conduit therefor towards the center of the hearth being lower than the flow speed of the hot blast into the hearth.

* * * * *